United States Patent [19]
Hagle

[11] 3,831,296
[45] Aug. 27, 1974

[54] ALPHANUMERIC TACTILE INFORMATION COMMUNICATION SYSTEM

[76] Inventor: Edward D. Hagle, 2338 Agate St., Eugene, Oreg. 97403

[22] Filed: Aug. 2, 1972

[21] Appl. No.: 277,384

[52] U.S. Cl............... 35/35 A, 35/5, 178/DIG. 32, 340/407
[51] Int. Cl. .......................................... G09b 21/04
[58] Field of Search ............... 35/35 A, 1, 8 R, 5, 6; 178/DIG. 32; 340/407

[56] References Cited
UNITED STATES PATENTS

| | | | |
|---|---|---|---|
| 2,570,908 | 10/1951 | Behr | 35/5 |
| 2,866,279 | 12/1958 | Surber | 35/35 A |
| 3,166,856 | 1/1965 | Uttal | 35/6 |
| 3,277,587 | 10/1966 | Holcombe | 35/5 |

FOREIGN PATENTS OR APPLICATIONS

| | | | |
|---|---|---|---|
| 741,288 | 11/1955 | Great Britain | 35/35 A |

OTHER PUBLICATIONS

"Talking Gloves for the Deaf and Blind," copyright 1917, by Harold T. Clark, pages 17–20 relied upon.

*Primary Examiner*—Wm. H. Grieb
*Attorney, Agent, or Firm*—Klarquist, Sparkman, Campbell, Leigh, Hall & Whinston

[57] ABSTRACT

A method and system for communicating with the blind and deaf person produces a sequence of electrical impulses corresponding to the characters on a typewriter keyboard. The impulses are employed to selectively actuate corresponding stimulators positioned on a surface areas of the handicapped person's body and arranged generally in the pattern of such keyboard. Each stimulator, upon being actuated, stimulates a portion of such area of skin corresponding to the character of the keyboard. A specific example of apparatus employed in the above method and system includes a typewriter terminal connected to a pair of gloves having a plurality of stimulators embedded therein.

5 Claims, 5 Drawing Figures

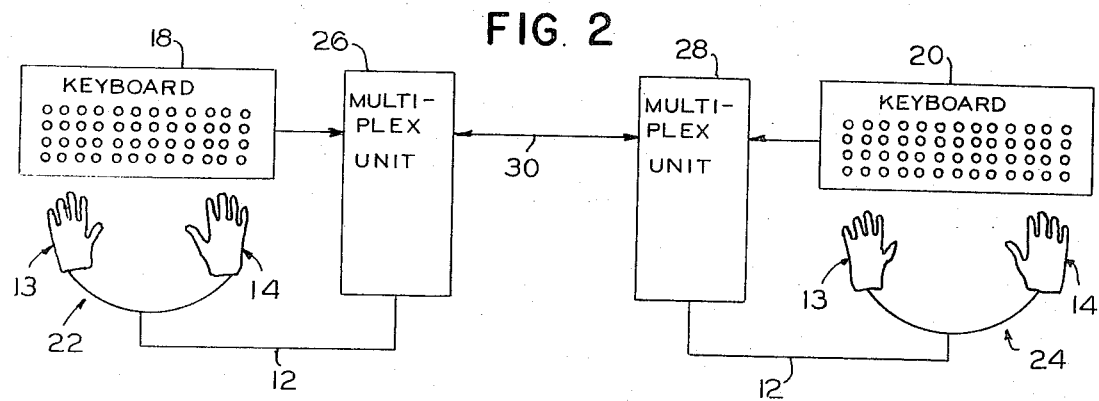
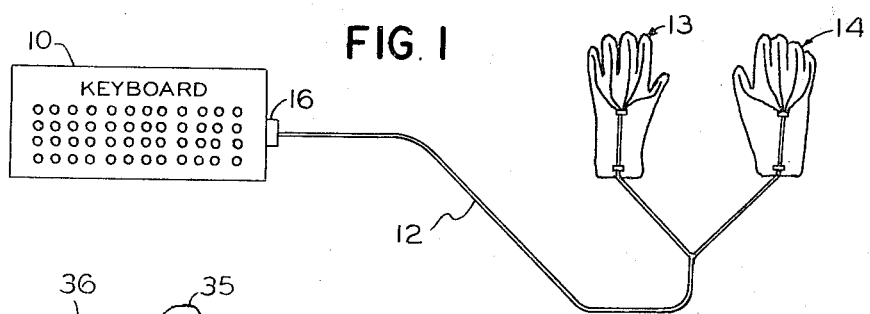
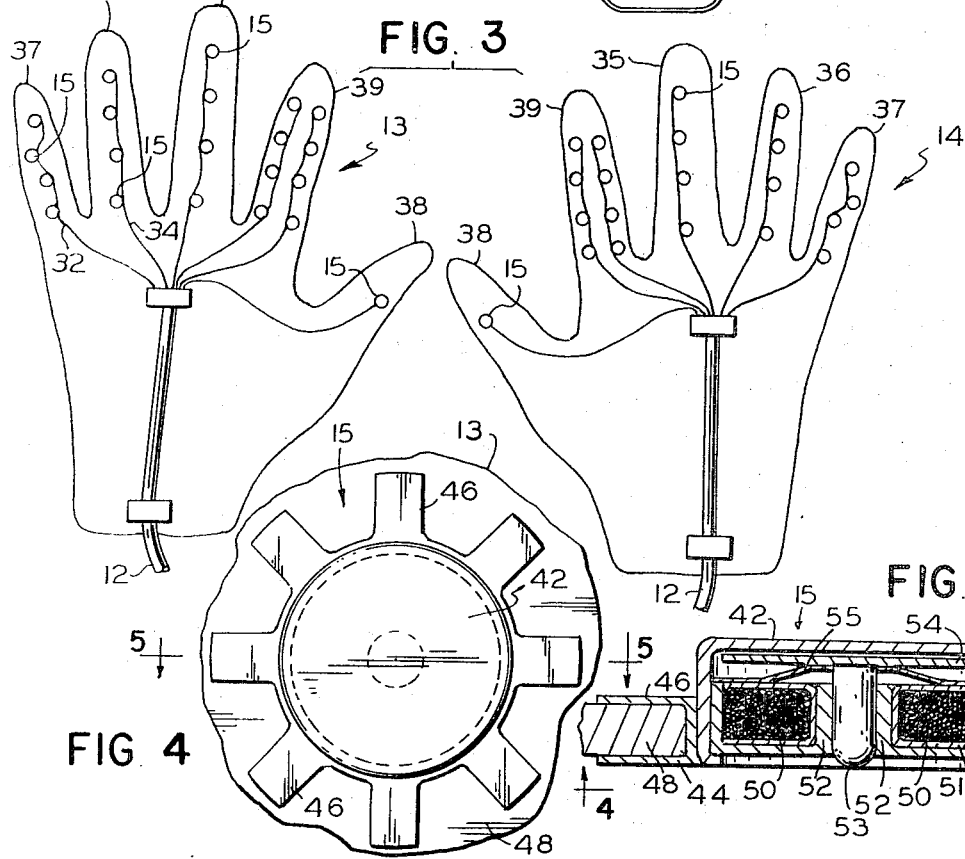

ALPHANUMERIC TACTILE INFORMATION COMMUNICATION SYSTEM

BACKGROUND OF THE INVENTION

This invention relates to the field of communication for handicapped persons. Some of the prior systems in this area are well known, such as Braille reading for persons who are blind, and sign language for persons who are deaf. Oral communication with a blind person and written communication with a deaf person is, however, possible. Persons who have more than one handicap, for example, persons who are both blind and deaf, present a much greater problem as far as communicating with either similarly handicapped or nonhandicapped persons is concerned.

A blind and deaf person is limited in his ability to communicate to systems which utilize one of his remaining senses, such as touch. In such cases, the person can be taught the Morse code for unwritten communication and Braille for reading. This method has several disadvantages in that non handicapped persons who do not know the Morse code or Braille cannot effectively communicate with such a handicapped person and also rapid communication with such a person over telephone lines or by radio channels is not practical.

SUMMARY OF THE INVENTION

The present invention provides effective rapid communication with a deaf and blind person, either with a similarly handicapped person or a nonhandicapped person when such persons are in the presence of each other or are distant from each other. The invention utilizes a plurality of tactile stimulators at spaced locations on an area of the body of a blind and deaf person which are arranged generally in a predetermined pattern, and preferably in the pattern of a typewriter keyboard. The backs of the hands of such person constitutes a suitable area and the stimulators may be attached to a pair of gloves which are put on when it is desired to communicate. The handicapped person is taught that each location of a stimulator represents a different alphanumeric character, and that the arrangement of characters corresponds with the predetermined pattern such as the keyboard arrangement of a standard electric typewriter. The stimulators may, for example, be electrically actuated and electrical impulses for actuating the stimulators can be produced by striking corresponding keys on a typewriter keyboard having electric contacts which are closed when the respective keys are struck. These impulses can be applied to the stimulators through a connecting cable so that the depression of each key actuates a single stimulator. With such a system a nonhandicapped person can communicate with a blind and deaf person by typing a message on the keyboard of an electric typewriter forming part of the system. The handicapped person can respond to the nonhandicapped person in the same manner by touch typing on the same or a similar typewriter keyboard. It is also possible using dual units for one blind and deaf person to rapidly communicate with another blind and deaf person. The use of the standard typewriter keyboard arrangement for locating the stimulators on the hands of the handicapped person has the advantage of avoiding encoding problems, but it is apparent that other arrangements of keys on a keyboard and a corresponding arrangement of the stimulators on the hands or other body surface of the handicapped person can be employed. Once the basic keyboard arrangement is learned by the handicapped person, anyone may communicate with him merely by typing on a keyboard.

It is accordingly one object of the invention to provide an improved method and system for communicating with a blind and deaf person.

It is another object of the present invention to provide a method and system for enabling a blind and deaf person to communicate with others including other blind and deaf persons by merely typing a message on a keyboard forming part of the communication system.

Further objects and advantages of the invention will be apparent from the following specification.

DRAWINGS

FIG. 1 is a schematic view illustrating the basic system of the present invention;

FIG. 2 is a schematic view illustrating a dual system including multiplex units by means of which a blind and deaf person may communicate with another blind and deaf person at a distance;

FIG. 3 is an enlarged view of a pair of gloves showing an arrangement of stimulators thereon;

FIG. 4 is a plan view on an enlarged scale of a stimulator unit;

FIG. 5 is a cross sectional view of the stimulator unit taken along the line 5—5 of FIG. 4.

DETAILED DESCRIPTION OF A PREFERRED EMBODIMENT

In FIG. 1, a basic communicating system comprising typewriter keyboard 10, cable 12 and gloves 13 and 14 is shown. The keyboard 10 is illustrated in block form but is preferably a standard typewriter keyboard of the type in which depression of each key closes an electric circuit corresponding to such key. Keyboards of this type are conventionally employed in typewriter terminals forming a part of data processing systems. On the keyboard, the alphanumeric characters of the English language (or other suitable language) are arranged according to a predetermined pattern and stimulators 15 not shown in FIG. 2 because of the small sacle but shown in FIG. 3, are arranged in a similar pattern. The gloves are connected to the typewriter terminal by cable 12 and connector 16. The cable 12 contains a plurality of small flexible insulated wires, all covered by a protective insulation sheath. When a key is struck, an electrical character signal is produced and a corresponding one of the stimulators of the gloves 13 and 14 is actuated.

FIG. 2 shows a dual system for allowing communication between two or more blind and deaf persons including communication over a telephone line. The dual system comprises keyboards 18 and 20, pairs 22 and 24 of gloves 13 and 14, and multiplex units 26 and 28. The details of the multiplex units are not shown or described, since such units are common and well known to those in the communication arts. By means of the multiplex units, a single transmission line, such as 30 in FIG. 2, can carry the character signals in both directions. As an example, data is typed on a keyboard 18, encoded by multiplexing unit 26, sent over transmission line 30 to multiplexing unit 28, decoded and applied to the corresponding stimulators on glove pair 24. It will be apparent that the line 30 can be a telephone line, a teletype line or other communication channel of a similar nature and can include a radio link.

If the person using the pair of gloves 24 has been taught the touch typing system and the arrangement of the keyboard 20, he may receive a message from the keyboard 18 through the stimulators on such gloves and may respond by typing a message on keyboard 20. If a nonhandicapped person is communicating with a blind and deaf person, the information typed on the keyboard 20 may be applied to a printing device such as a teletype terminal at the keyboard 18 to provide a readout of what the blind and deaf person is typing. The nonhandicapped person can then respond by typing on the keyboard 18.

The arrangement of actuators on the gloves 13 and 14 according to a preferred embodiment of the present invention is shown in FIG. 3. The backs of the hands have been found to be particularly satisfactory since stimulators 15 can be easily held thereon by the gloves 13 and 14, and the sensitivity of this area of the body to touch enables effective differentiation between the action of the various stimulators 15. The gloves shown in FIG. 3 have the stimulators 15 mounted in the backs of the gloves. Each stimulator has a pair of wires running to it through a distribution cable such as 32 or 34 secured along the top of the gloves forming in part a continuation of the cable 12. When actuated, each stimulator presses the end of a plunger against the back of the hand as later described in more detail.

The arrangement of the stimulators on the gloves is of importance. Each stimulator must produce a stimulating effect at a different location on the hand. Thus it is necessary to provide adequate separation between stimulators to insure accurate reception. It will be noted that on the middle finger 35, ring finger 36 and little finger 37 of each glove there are four stimulators, while on the thumb 38 there is one only and on the index finger 39 there are eight. This arrangement not only provides for discrimination between stimulators but also provides a pattern which corresponds to that of a typewriter keyboard. Thus the four stimulators in a row on each of the 35, 36 and 37 fingers correspond to the keys which will be struck by such fingers of the operator of a typewriter using the touch system, and the same is true of the eight stimulators on each of the fingers 39. The single stimulator on each thumb 38 corresponds to the shift key. This enables the blind and deaf person to associate the typewriter keyboard and a particular key thereon with a particular stimulator on the glove pairs, and such person can thus be easily trained to type and receive messages. As an example, the character "A" on a standard typewriter keyboard is represented by a stimulator 15 on the little finger 37 of the left glove in FIG. 3 and the character "X" is represented by a stimulator 15 on the ring finger 36 of the left glove in FIG. 3. As a further aid to understanding the preferred arrangement, it will be observed that the location of the stimulators on a particular finger corresponds to the position the finger would be in to strike the key on a keyboard. Thus the characters of the fourth row are all represented by stimulators located closest to the finger tips as the fingers must be fully extended to strike these characters on the keyboard.

The construction and mounting of an example of a stimulator 15 is shown in FIGS. 4 and 5. The stimulator is preferably an electromagnetically actuated device for applying a slight impact or pressure to the surface of the skin of the user, although a device vibrating a member in contact with the skin or applying a slight electric shock as well as pneumatic devices can also be employed. The stimulators disclosed are of the first type and each includes a housing 42, a bottom mounting 44 attached to the housing and top mounting flanges 46 attached to the periphery of the housing. The stimulators are mounted in the upper sides of the gloves by first punching a hole of suitable diameter at the desired location. A stimulator is then pushed through the hole from the underside so that the mounting 44 is against the glove material 48. The top mounting flanges 46 are initially perpendicular to the bottom mounting 44, but after the stimulator is pushed through the hole they are bent down against the glove material so as to be parallel to the bottom mounting. As shown in FIG. 5, the stimulator is thus securely mounted to the glove material and properly positioned for delivering mechanical impulses to the skin surface.

As illustrated in FIG. 5, the stimulator includes a winding 50 wound on a bobbin 51 positioned on a core 52 of suitable magnetic material. A plunger 53 of nonmagnetic material extends through a central aperture in the core 52 so that it has a free end extending from the housing. A disc of magnetic material 54 is attached to the other end of the plunger and is held in the position shown by a spring washer 55. The stimulator is operated by applying an electrical pulse via wire 56 to the winding 50. A return path to complete the circuit is provided by wire 57. When the stimulator is energized, it attracts the disc 54 to produce a sharp downward movement of the plunger 53. This produces a quick tap on the skin. As soon as the electrical pulse ceases, the spring washer 55 returns the disc 54 and plunger 53 to their original position.

While the operation of the system is believed clear from the foregoing description, the following summary is given. A blind and deaf person who is to receive information places the gloves 13 and 14 on his hands. The stimulators 15 mounted in the upper sides of the gloves are connected through the cable 12 to a keyboard 10 or to a keyboard 18 or 20 through the multiplex system of FIG. 2. The message is then typed on the keyboard which in turn produces a sequence of electrical impulses which are applied to the corresponding stimulators. As each stimulator receives an electric impulse it produces a short duration tap on a distinct portion of the hands of the blind and deaf person. Since the location of each stimulator corresponds to the location on the keyboard of the key containing the character represented, a deaf and blind person taught the arrangement of the keys and stimulators can receive and send messages. By using dual communication units a two-way communication between two such blind and deaf persons is possible. It is, of course, possible to arrange the stimulators in the pattern of a keyboard on any other suitable portion of the surface of the body. While the method and system of the present invention is particularly useful for communication with a person who is both blind and deaf, such method and system is also useful for communication with either a blind person or a deaf person or even between normal persons, where the ability to communicate is also impaired by noise or darkness or both.

I claim:

1. A system for communicating with a person which comprises:

impulse-producing means for producing a selected sequence of impulses each corresponding to an alphanumeric character;

a plurality of stimulator elements actuatable by said impulses, each said stimulator element comprising an impulse-operated mechanical stimulator device;

means for holding said stimulator elements in discrete locations on a surface area of the body of said person with said elements arranged in a predetermined portion in which the discrete body location of each of said stimulator elements represents a single discrete said character;

said impulse-producing means being remote from said stimulator elements;

and means for delivering said sequence of impulses to selected ones of said stimulator elements to selectively actuate each of said stimulator elements by the impulses corresponding to the character represented by the location of such stimultor element.

2. The system of claim 1 wherein said producing means is a keyboard having keys arranged in a predetermined pattern and said keyboard includes means for producing said impulses as a result of sequentially striking said keys, said stimulator elements being arranged on the fingers of said person in a pattern corresponding to said pattern of said keys and in which a stimulator element corresponds to a character on a key of said keyboard and is located on the finger which is employed to strike such key during touch system operation of said keyboard.

3. The system of claim 2 which includes means for multiplex transmission of said impulses from said keyboard to said stimulator elements to transmit all of said impulses from said keyboard through a single communication channel.

4. The system of claim 1 in which said means for holding said stimulator elements is a pair of gloves of flexible material which support each stimulator element.

5. A system according to claim 1 for communication between two persons comprising:

said impulse-producing means including first and second keyboard means operable one by each of said persons for producing a sequence of electrical impulses each corresponding to a character on the keys of a typewriter keyboard;

said mechanical stimulator devices including a first set of electrically actuated stimulator elements each corresponding to one of said characters and with said set being disposed in the general pattern of said typewriter keyboard on a surface area of the body of one of said persons;

and a second set of electrically actuated stimulator elements each corresponding to one of said characters and with said set being disposed in the general pattern of said typewriter keyboard on a surface area of the body of the other of said persons;

and means for delivering the electrical impulses from said first keyboard means and said second keyboard means to said first and second sets of stimulators respectively to selectively actuate in selected sequence the stimulator elements respective corresponding to said electrical impulses.

* * * * *